No. 855,076. PATENTED MAY 28, 1907.
E. L. THOMPSON.
DRY PIPE VALVE FOR AUTOMATIC SPRINKLER SYSTEMS.
APPLICATION FILED SEPT. 22, 1903.
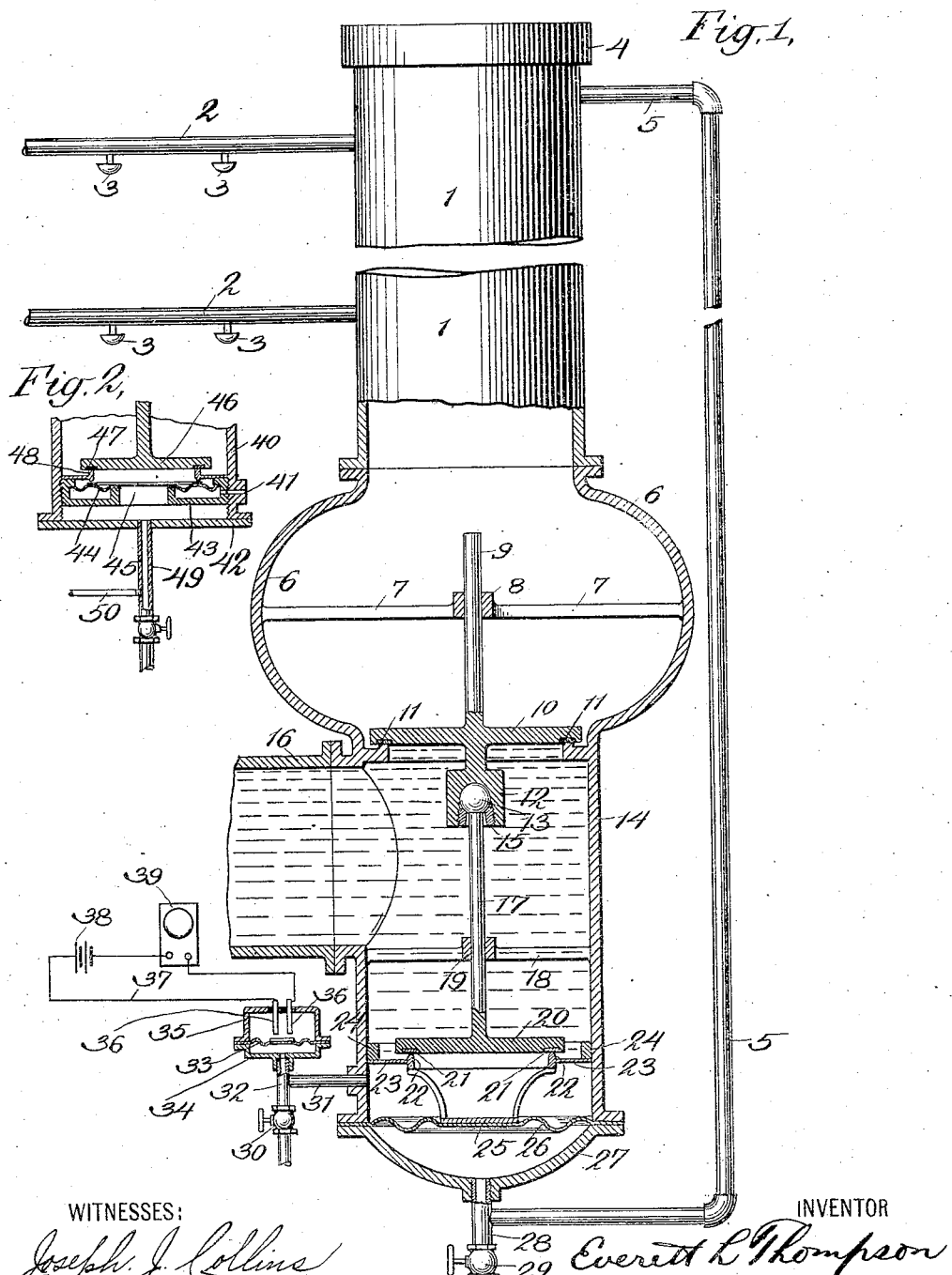
WITNESSES:
Joseph J. Collins
Jessie B. Ray.
INVENTOR
Everett L. Thompson
BY
Duncan & Duncan ATTORNEYS

UNITED STATES PATENT OFFICE.

EVERETT L. THOMPSON, OF NEW YORK, N. Y.

DRY-PIPE VALVE FOR AUTOMATIC-SPRINKLER SYSTEMS.

No. 855,076.   Specification of Letters Patent.   Patented May 28, 1907.

Application filed September 22, 1903. Serial No. 174,159.

*To all whom it may concern:*

Be it known that I, EVERETT L. THOMPSON, a citizen of the United States, and a resident of the borough of Brooklyn, city of New York, county of Kings, and State of New York, have invented certain new and useful Improvements in Dry-Pipe Valves for Automatic-Sprinkler Systems, of which the following is a specification taken in connection with the accompanying drawings which form a part of the same.

This invention relates to dry pipe valves for automatic sprinkler systems, such as are adapted to normally prevent access of water to the distributing systems of such sprinklers and to effectually and certainly admit the water to the distributing systems in the event of fire.

In the accompanying drawings, Figure 1 is a vertical sectional view of apparatus embodying this invention. Fig. 2 is a detail sectional view showing a modified construction.

In the illustrated embodiment of this invention, 1 is a supply pipe communicating with a series of distributing pipes 2 arranged as desired throughout a building and provided with automatic sprinklers 3 to form a distributing system. The water pipe 16 is connected with said supply pipe to furnish water thereto in the event of fire, but the access of water to the supply pipe and distributing system is controlled by the dry pipe valve mechanism, the supply valve 10 which may be provided with the packing 11 normally preventing access of water to the distributing system which is maintained under air pressure preferably somewhat less than the water pressure in the water pipe, as is usual in this art.

The supply valve is preferably formed with the stem 9 guided in the bearing 8 in the brace 7 secured to the upper part 6 of the valve casing so that the supply valve is accurately guided with respect to its seat. The compensating valve 20 preferably having a differential area with respect to the supply valve is connected therewith so that the two operate in unison. The rod 17 secured to the compensating valve may be used for this purpose, the rod being indicated as passing through the bearing 19 in the brace 18. The upper end of this rod may be flexibly connected with the supply valve so that both these valves may accurately coact with their seats. The rod is indicated as being formed with the ball 13 thereon engaging the socket 12 and secured therein by the sleeve 15 indicated.

The compensating valve may be formed with a suitable packing 21 if desired and is shown as coacting with the compensating valve seat 22, one of these elements being preferably movably mounted so that relative movement of the two may occur while the supply-valve is closed. In this case the valve seat is indicated as movably mounted by the flexible flange 23 secured to the sleeve 24 mounted in the valve casing 14. This flexible flange normally tends to draw the valve seat 22 downward into released position so as to allow the access of water from the supply pipe 16 to the compensating chamber under the compensating valve, the strength of this flexible flange being of course properly proportioned to secure the desired movement under the working pressures employed. Suitable means are employed to hold the compensating valve and its seat in contact except when the emergency operation of this valve takes place. For this purpose, an auxiliary chamber is provided preferably formed by the lower end 27 of the casing and its upper wall being formed of the flexible corrugated diaphragm 26 which separates the auxiliary chamber from the compensating chamber. This diaphragm has mounted thereon the support 25 formed with the spider arms indicated which may be connected with the compensating valve seat 22 but which are preferably loosely in engagement with the under surface of the same. The auxiliary chamber is connected by the auxiliary pipe 5 with the upper end 4 of the supply pipe above the distributing pipes and therefore above the highest level which water can reach in the distributing system. The auxiliary chamber is also preferably provided with the drain pipe 28 controlled by the valve 29 indicated.

A suitable alarm such as a mechanical or electrical alarm used in this art may be connected with this dry pipe valve and as indicated the alarm comprises the chamber 34 having the flexible diaphragm 33 mounted therein and inclosed by the cap 35 in which the terminals 36 are mounted so as to be insulated from each other. These terminals are connected with the circuit 37 comprising the battery 38 and a suitable alarm device or bell 39. This alarm chamber is connected with the pipe 32 communicating with the pipe 31 opening into the compensating chamber and the relief valve 30 may be provided to relieve the pressure in the compensating chamber and alarm chamber as desired.

If desired, the auxiliary chamber may be given the annular form indicated in Fig. 2 in which the auxiliary chamber 43 is indicated as provided with the flexible diaphragm top 44 mounted within the lower end 40 of the valve casing and operating to press upward the compensating valve seat 48 into co-öperation with the packing 47 of the compensating valve 46. The compensating chamber 45 communicates with the valve relief pipe 49 in the bottom 42 and with the alarm pipe 50, the auxiliary passage 41 communicating with the auxiliary pipe previously described.

In the normal position indicated in the drawings the air pressure upon the supply valve holds it against its seat in connection with the unbalanced water pressure acting upon the compensating valve, the relative areas of the valve and compensating valve being so proportioned that the water pressure on the smaller area of the compensating valve which is opposed only by the reduced or atmospheric pressure within the compensating chamber holds the supply valve securely closed with the working air pressure which it is desired to employ in the system. In the event of the opening of the sprinklers or the reduction for any other cause of the air pressure in the distributing system, the water pressure on the underside of the supply valve eventually becomes sufficient to lift it from its seat. Also the reduction of pressure in the auxiliary chamber and the water pressure on the flexible flange causes the separation of the compensating valve from its seat and the admission of water to the compensating chamber which at once destroys the unbalanced pressure upon the upper side of the compensating valve and allows the upward movement of the supply valve away from its seat. The admission of water to the compensating chamber operates the alarm acting in the form indicated in the drawings to force the alarm diaphragm 33 upward so as to establish electrical contact between the terminals 36 which rings the electric alarm. By mounting one of the connected valves or its seat in a yielding manner, both the valves are caused to seat accurately under all conditions. Leakage is thus effectually prevented and excessive pressures between the valves and seats which tend to impede the emergency operation of the device is thus rendered unnecessary.

It is, of course, understood by those familiar with this art that many changes in the form, proportion and numbers of parts of this apparatus may be made, parts of the same may be employed in connection with other devices and parts may be used without employing all of the same without departing from the spirit of this invention or losing the advantages of the same. I do not, therefore, desire to be limited to the disclosure which has been made in this case, but

What I claim as new and what I desire to secure by Letters Patent is set forth in the appended claims.

1. In automatic sprinklers, a supply pipe having distributing pipes and sprinklers connected therewith to form a distributing system, a water pipe connected to said supply pipe, a supply valve governing the access of water to said supply pipe, a differential compensating valve yieldingly connected to said supply valve, a compensating chamber adjacent said water pipe, a movable valve seat coöperating with said compensating valve mounted upon a flexible flange normally tending to hold said valve seat in released position, an auxiliary chamber having a flexible diaphragm dividing the same from said compensating chamber, a support connecting said compensating valve seat and said diaphragm, an auxiliary pipe connecting said auxiliary chamber and said distributing system above said distributing pipes and an alarm connected to said compensating chamber.

2. In automatic sprinklers, a supply pipe connecting with a distributing system, a water pipe connected to said supply pipe, a supply valve opening into said water pipe and governing the access of water thereto, a compensating valve connected to said supply valve, a compensating chamber adjacent said water pipe, a valve seat coöperating with said compensating valve and yieldingly mounted with respect thereto, an auxiliary chamber having a yielding wall to normally hold said compensating valve and seat in engagement, and an auxiliary pipe connecting said auxiliary chamber and said distributing system.

3. In automatic sprinklers, a distributing system comprising a supply pipe, a supply valve, a water pipe connecting with said supply pipe through said supply valve, a compensating valve connected to said supply valve and operating therewith, a compensating valve seat, an auxiliary chamber connected to said distributing system, and means controlled by the pressure in said auxiliary chamber to separate said compensating valve and seat on the reduction of pressure in said distributing system.

4. In automatic sprinklers, a distributing system comprising a supply pipe, a supply valve, a water pipe connecting with said supply pipe through said supply valve, a compensating valve, a compensating chamber normally under reduced pressure and provided with a yielding valve seat to engage said compensating valve and means to move said valve seat away from said valve on the reduction of pressure in said distributing system.

5. In dry pipe valves, a valve casing to be connected with a supply pipe and with a water pipe, a supply valve coöperating with a seat in said casing, a differential compensating valve yieldingly connected with said supply valve, a compensating chamber having a valve seat flexibly mounted and normally tending to move away from said compensating valve into released position, and an auxiliary chamber provided with yielding means to normally press said compensating valve seat against its valve.

6. In dry pipe valves, a valve casing, a supply valve coöperating with a seat therein, a compensating valve connected with said supply valve, a compensating valve seat yieldingly mounted with respect to said compensating valve and forming a compensating chamber under the same, and an auxiliary chamber adjacent said compensating chamber and provided with a flexible diaphragm to hold said compensating valve seat against its valve.

7. In dry pipe valves, a valve casing having a water pipe connection adapted to be joined to a water pipe, a supply valve coöperating with a seat in said casing, a compensating chamber, a compensating valve connected with said supply valve and operating between said water pipe connection and said compensating chamber and a compensating valve seat yieldingly mounted to move relatively to said compensating valve while said supply valve is in closed position.

8. In dry pipe valves, a valve casing having a water pipe connection adapted to be joined to a water pipe, a supply valve coöperating with a seat in said casing, a compensating chamber, a compensating valve connected with said supply valve and operating between said water pipe connection and said compensating chamber, a compensating valve seat yieldingly mounted to move with respect to said compensating valve while said supply valve is in closed position and means to normally maintain said compensating valve seat in engagement with its valve.

9. In dry pipe valves, a valve casing having a water pipe connection adapted to be joined to a water pipe, a supply valve coöperating with a seat in said valve casing, a compensating chamber, a compensating valve connected with said supply valve and operating between said water pipe connection and said compensating chamber, and a compensating valve seat yieldingly mounted in said casing to coöperate with said compensating valve.

10. In dry pipe valves, a valve casing, a supply valve to coöperate with a seat therein, a compensating valve connected to said supply valve, a compensating valve seat yieldingly mounted to move with respect to said compensating valve and communicating with a compensating chamber normally under reduced pressure and to be connected with an alarm and yielding means to normally hold said compensating valve and seat in engagement.

11. In dry pipe valves, a valve casing having a water pipe connection adapted to be joined to a water pipe, a supply valve seat in said casing, a compensating chamber, a yieldingly mounted compensating valve seat between said water pipe connection and said compensating chamber, a supply valve above said supply valve seat and a compensating valve connected with said supply valve and coöperating with said compensating valve seat and means for moving said compensating valve seat relatively to said compensating valve while said supply valve is in closed position.

12. In dry pipe valves, a valve casing having a water pipe connection adapted to be joined to a water pipe, a supply valve seat in said casing, a compensating chamber, a compensating valve seat yieldingly mounted in said casing between said water pipe connection and said compensating chamber, a supply valve above said supply valve seat and a compensating valve connected with said supply valve and operating above said compensating valve seat and means connected with the upper distributing system to relieve the pressure in said compensating chamber.

13. In dry pipe valves, a valve casing having a water pipe connection adapted to be joined to a water pipe, a supply valve seat in said casing, a yieldingly mounted compensating valve seat in said casing, a supply valve and a compensating valve connected therewith and operating to move simultaneously toward their seats and means connected with the upper distributing system to cause a relative movement between said compensating valve and seat.

EVERETT L. THOMPSON.

Witnesses:
HARRY L. DUNCAN,
JESSIE B. KAY.